(12) United States Patent
Horng et al.

(10) Patent No.: US 7,016,405 B2
(45) Date of Patent: Mar. 21, 2006

(54) SIGNAL CIRCULATION FOR ADAPTIVE SIGNAL EQUALIZATION IN DIGITAL COMMUNICATION SYSTEMS

(75) Inventors: Jyhchau Horng, Warren, NJ (US); Jinyun Zhang, New Providence, NJ (US); Philip Orlik, Scotch Plains, NJ (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 706 days.

(21) Appl. No.: 10/075,330

(22) Filed: Feb. 14, 2002

(65) Prior Publication Data

US 2003/0152144 A1     Aug. 14, 2003

(51) Int. Cl.
*H03H 7/30*     (2006.01)
*H03H 7/40*     (2006.01)
*H03K 5/159*    (2006.01)

(52) U.S. Cl. .............. 375/232; 375/229; 375/230; 708/300; 708/819

(58) Field of Classification Search .......... 375/229, 375/230, 232, 233; 708/300
See application file for complete search history.

(56) References Cited

U.S. PATENT DOCUMENTS

| | | | | |
|---|---|---|---|---|
| 5,285,474 A | * | 2/1994 | Chow et al. | 375/231 |
| 5,502,507 A | * | 3/1996 | Kim | 348/607 |
| 5,602,872 A | * | 2/1997 | Andrews | 375/234 |
| 5,809,074 A | * | 9/1998 | Werner et al. | 375/233 |
| 6,498,820 B1 | * | 12/2002 | Thomson et al. | 375/346 |

OTHER PUBLICATIONS

S. Chern, J. Horng, and K.M. Wong, "The Performance of the Hybrid LMS Adaptive Algorithm," *Signal Processing*, vol. 44, No. 1, pp. 67-88, Jun. 1995.

* cited by examiner

*Primary Examiner*—Stephen Chin
*Assistant Examiner*—Erin M. File
(74) *Attorney, Agent, or Firm*—Dirk Brinkman; Andrew J. Curtin

(57) ABSTRACT

A method and system for equalizing a signal transmitted via a channel of a communications system stores an input signal received via the channel in a main buffer. A training signal portion of the received input signal is stored in a circular buffer as a circulating training signal. A mean square error of the training signal is minimized while estimating the transmitted signal, until the mean square error is less than a predetermine threshold. In this case, the input signal received via the channel is equalized directly to make decisions on symbols of the signal transmitted via the channel. During an initial stage of training, the mean square error is determined directly from the training signal, during subsequent stages of training the circulating training signal is used.

4 Claims, 2 Drawing Sheets

SIGNAL CIRCULATION FOR ADAPTIVE SIGNAL EQUALIZATION IN DIGITAL COMMUNICATION SYSTEMS

FIELD OF THE INVENTION

The present invention relates generally to digital communications systems, and more particularly to adaptive signal equalization in digital communication systems.

BACKGROUND OF THE INVENTION

In digital communication system, signals are usually transmitted over channels having a limited bandwidth. For high-speed data transmission, such bandwidth limited channels result in inter-symbol interference (ISI). Wireline channels are also subject to frequency-selective fading, and wireless channels experience multipath propagation. Furthermore, in most digital communication systems, the frequency response of the channels is usually not known a priori. This makes it difficult to design optimum filters for modulators and demodulators. In addition, for most practical channels, the frequency-response characteristics are time-variant so it is not possible to design optimum fixed demodulation filters.

The solution to the ISI problem is to design a receiver that employs means for compensating or reducing the ISI in the received signal. The compensator for the ISI is called an equalizer. There are many types of equalizers known for practical digital communication systems, such as maximum-likelihood (ML) estimation based equalizers, linear filtering with adjustable coefficients, decision feedback equalizers (DFE), etc., see J. G. Proakis, *Digital Communications*, Fourth Edition, McGraw-Hill, New York, 2001.

In order to be used for unknown channels, the equalizers are usually adjustable to the channel response, and for time-variant channels, are adaptive to the time variations in the channel impulse response (CIR). This technique is called adaptive equalization of the signal received via the channel.

A least mean square (LMS) process is the most commonly used for adaptive equalizing because of its computational simplicity. The LMS process is based on minimizing the mean square error (MSE) between a transmitted signal and an estimate of that signal at an output of the equalizer.

The major disadvantage of the LMS process is that the convergence rate is dependent on the eigenvalue spread of the autocorrelation matrix of the received signal. In addition, the LMS process needs a relatively long sequence of symbols in a training signal during a training stage.

In order to obtain faster convergence, one can use a recursive least-square (RLS) process. Because this process needs to estimate the power of the transmitted signal, it is more complicated and involves additional parameters. This technique can also introduce an "overshot" or "out of convergence" problem when the received sequence of symbols in the training signal is not long enough to make a correct power estimation, see S. Chern, J. Horng, and K. M. Wong, "The Performance of the Hybrid LMS Adaptive Algorithm," *Signal Processing*, Vol. 44, No. 1, pp. 67–88, June 1995. This problem usually occurs during the initial training stage, especially when the value of the step-size is large.

Therefore, there is a need for a reduced complexity system and method that improves equalization of a signal received via a channel of a communications system.

SUMMARY OF THE INVENTION

The invention provides a system and method that combines adaptive equalizers with training signal circulation for signal equalization in digital communication systems. With training signal circulation, the invention improves the overall performance of adaptive equalizers at a reduced complexity and slow convergence rates, particularly when a short sequence of symbols is used in the training signal. This invention can be used with equalizers with slow convergent rates, but it can also be effectively used with other types of equalizers with short training signal symbol sequences.

More particularly, the invention provides a method and system for equalizing a signal transmitted via a channel of a communications system. An input signal received via the channel is stored in a main buffer. A training signal portion of the received input signal is stored in a circular buffer as a circulating training signal.

A mean square error of the training signal and an estimate of the transmitted signal is minimized until the mean square error is less than a predetermined threshold. In this case, the input signal received via the channel and stored in the main buffer is equalized directly to make decisions on symbols of the signal transmitted via the channel. During an initial stage of training, the mean square error is determined directly from the training signal, during subsequent stages of training the circulating training signal is used.

DETAILED DESCRIPTION OF THE PREFERRED EMBODIMENT

The invention provides means for improving the convergence properties of LMS-type equalizers with a short sequence of symbols in a training signal by circulating the training signal while making an initial estimate of the channel impulse response. With training signal circulation, LMS-type equalizers can reach a convergent stage or steady state even though the sequence of symbols in the training signal is very short. Therefore, the system and method according to the invention has the low computational complexity of LMS-type equalizers, and the steady-state performance of RLS-type equalizers. Fundamentally, the invention uses the following major functions: a circulation trigger with a predetermined threshold that is the target error value of the error signal, i.e., the mean square error (MSE), training signal circulation, and a desired response generator and selection. This invention can be used with LMS-type of equalizer, and also with other types of equalizer and short sequences of symbols in the training signal.

Adaptive Equalizer

Figure 1:
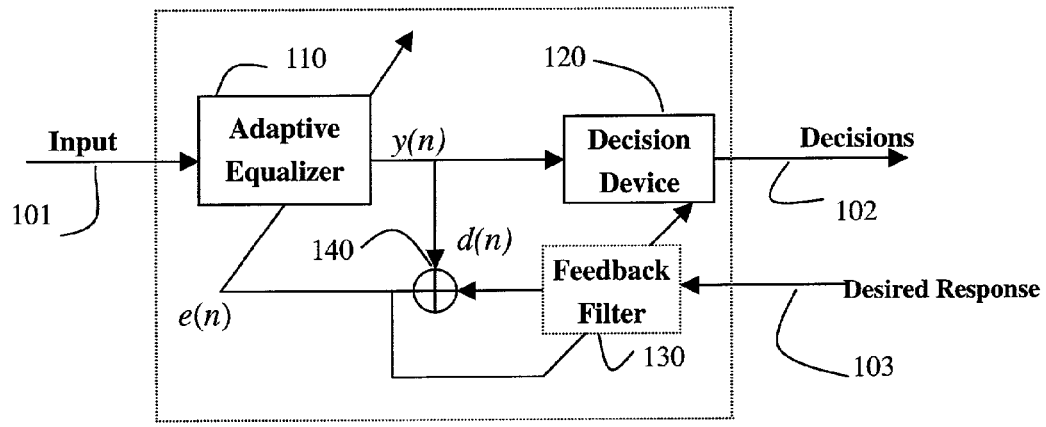
FIG. 1 is a block diagram of components of a receiver according to an embodiment of the invention.

FIG. 1 shows some of the components of a receiver 100 according to an embodiment of the invention. The receiver includes an adaptive equalizer 110, a decision device 120, a feedback filter 130, and an adder 140. An input signal 101 to the receiver 100 is a distorted version of a transmitted signal with noise. An output signal 102 is a decision 102. In general, the equalizer 110 uses an adaptive linear filter with adjustable weight coefficients. For an LMS-type equalizer, the weight coefficients of the taps of the equalizer 110 are adjusted recursively as follows $$w_i(n+1)=w_i(n)+\mu e(n)\cdot v_i(n) \text{ for } i=1,\ldots,N, \quad (1)$$

where N is a length of the equalizer, w is the tap weight vector, n is a time index, $\mu$ is a step size, e is an error signal, and v is the input signal 101. The error signal input to the equalizer is generated by the adder 140 according to $$e(n)=d(n)-y(n), \quad (2)$$

where y(n) is an output signal of the adaptive equalizer 110, and d(n) is an output of the feedback filter 120.

In general, the desired response 103 is selected using a sequence of symbols in a training signal during a training stage, and the input signal in an equalization stage. For a simplified equalization structure, the feedback filter 130 can be by-passed. In this case, the error signal e(n) is a difference between the desired response 103 and the output 102 of the adaptive equalizer.

Adaptive Equalizer with Training Signal Circulation

Figure 2:
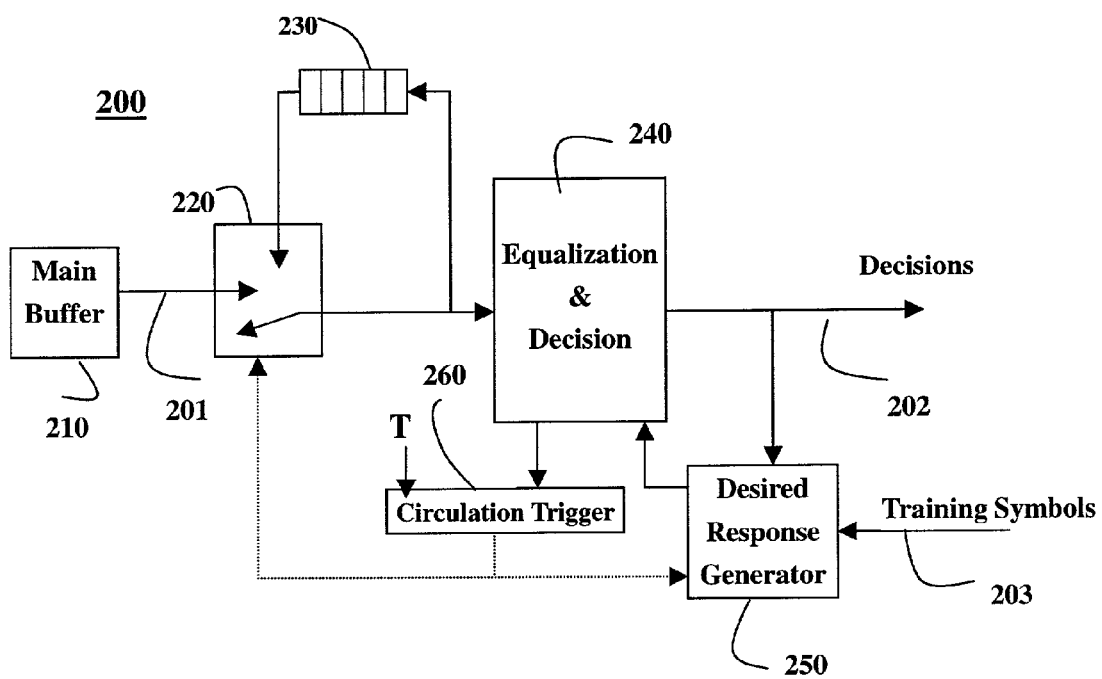
FIG. 2 is a block diagram of a receiver adapted for training signal circulation according to the invention.

FIG. 2 shows some of the components of a receiver 200 with training signal circulation according to the invention. These components include a main buffer 210 for storing and providing an input signal 201 to a switch 220. The switch 220 also receives input from a circulation buffer 230. The size of the circulation buffer is equal to the size of the sequence of symbols in the training signal.

The circulation buffer 230 is filled with the input training signal during an initial training stage. The input training signal is also fed to an equalization and decision device 240. The receiver also includes a desired response generator 250 coupled to the device 240, and a circulation trigger 260 that controls the switch 220 and the desired response generator 250. The output signal 202 is the decision symbols, and the desired response generator selects the output from the training symbols 203 in the training stage and the decision symbols 202 in the equalization stage.

As described above, the LMS-type equalizer generally needs a longer sequence of training symbols than the RLS-type equalizer. When the training signal is too short, the LMS-type equalizer does not operate well during the initial equalization stage. However, if the initial filter coefficients are substantially close to those in the steady state, the equalizer still can reach the convergent state even though the training sequence is short.

In a practical system, one cannot predict the optimum filter coefficients of the initial selection because the channel impulse response is not known before the training stage. Based on above, the invention circulates the received training signal during the training stage as the input signal to the equalizer and the coefficients obtained during the first iteration of training can be used as the initial coefficients during the subsequent iterations of training. Therefore, the initial filter coefficients approach the optimum filer coefficients in steady state and the equalizer can operate near the optimal weight vector, w, in the equalization stage even though the sequence of symbols in the training signal is short.

System Operation

Figure 3:
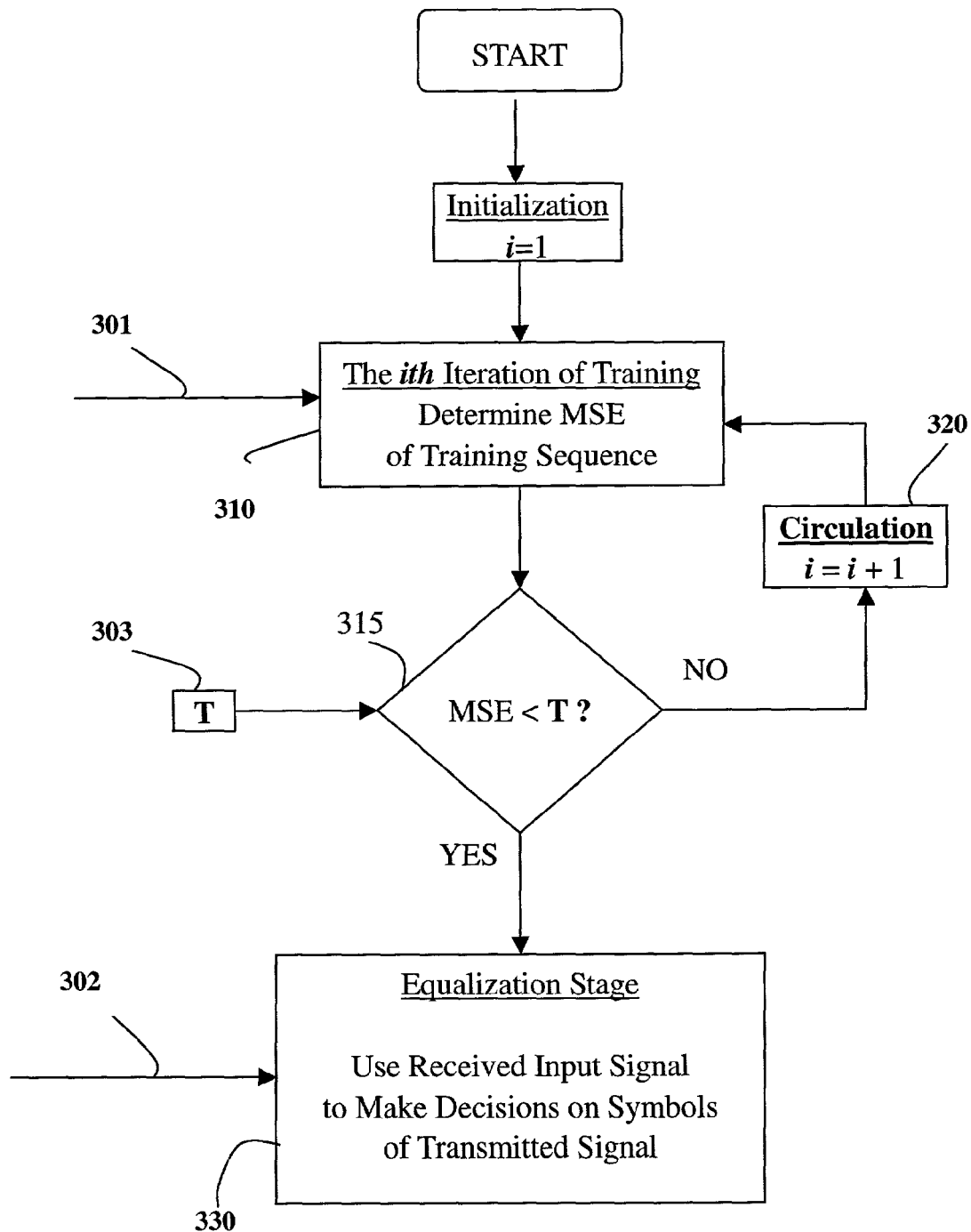
FIG. 3 is a flow diagram of adaptive equalizing method according to the invention.

As shown in FIG. 3, during operation, the receiver 200 operates in initial and subsequent training stages 310, and an equalization stage 330. During the initial training stage 310, the switch 220 selects the output from the main buffer 210 as the initial input signal 201 to the device 240, and the circulation buffer 230. The main buffer stores the data received via a channel of a communications system.

During the training stage 310, the desired response generator 250 selects the training sequence 203 as output, and the decision symbols 202 for the equalization stage. During the initial iteration (i=1) of the training stage 310, the MSE of the training sequence 301 and an estimate of the transmitted training signal is determined. The circulation trigger 260 compares the MSE with a threshold T 303, which is predetermined from a target MSE.

In step 315, if the MSE is greater than the predetermined threshold T 303, then the receiver has not yet converged, and additional training stage 310 is necessary. Therefore, training signal circulation 320 is triggered, and the receiver enters the ith iteration of training stage 310 with i>1. Now, the switch 220 selects the output from the circulation buffer 230 as the input to the equalizer 240, and the next iteration of training is performed on the circulating training signal 301. The iterations of subsequent training determine the MSE of the circulating training signal and repeat until the MSE is less than the predetermined threshold T 303.

When the threshold requirement is satisfied, the receiver 200 enters the equalization stage 330. During the equalization stage 330, the circulation buffer 230 is not used, and the equalizer uses the received input signal 302 directly to make decisions on the symbols of the signal transmitted via the channel.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for equalizing a signal transmitted via a channel of a communications system, comprising:

storing a training signal received via the channel in a circular buffer as a circulating training signal, wherein the training signal includes a sequence of symbols, and the number of symbols in the sequence is less than five;

minimizing a mean square error of the training signal while estimating the training signal;

determining if the mean square error is greater than a predetermined threshold, and minimizing the mean square error of the circulating training signal and the estimate of the training signal until the mean square error is less than the predetermined threshold; and equalizing an input signal received directly via the channel to make decisions on symbols of the signal transmitted via the channel if the mean square error is less than the predetermined threshold.

2. The method of claim 1 wherein the predetermined threshold is a target mean square error.

3. A system for equalizing a signal transmitted via a channel of a communications system, comprising:

a main buffer configured to store an input signal received via the channel;

a circular buffer configured to store a training signal of the input signal as a circulating training signal, wherein the training signal includes a sequence of symbols, and the number of symbols in the sequence is less than five;

an equalization and decision device;

a desired response generator coupled to the equalization and decision device;

a circulation trigger coupled to the equalization and decision device; and a switch controlled by the circulation trigger, the switch feeding the training signal to the equalization and decision device during training stages, and the switch feeding the input signal to the equalization and decision device during an equalization stage.

4. The system of claim 3 further comprising:

means for minimizing a mean square error of the training signal while estimating the training signal;

means for determining if the mean square error is greater than a predetermined threshold, and minimizing the mean square error of the circulating training signal and the estimate of the training signal until the mean square error is less than the predetermined threshold; and means for equalizing the input signal received directly via the channel to make decisions on symbols of the signal transmitted via the channel if the mean square error is less than the predetermined threshold.

* * * * *